(12) United States Patent
Chappaz et al.

(10) Patent No.: US 10,503,259 B2
(45) Date of Patent: Dec. 10, 2019

(54) VIBRATING DEVICE COMPRISING EMBEDDED MECHANICAL REFLECTORS FOR DEFINING AN ACTIVE PLATE MODE PROPAGATION AREA AND MOBILE APPARATUS COMPRISING THE DEVICE

(71) Applicants: COMMISSARIAT A L'ENERGIE ATOMIQUE ET AUX ENERGIES ALTERNATIVES, Paris (FR); STMicroelectronics (Crolles 2) SAS, Crolles (FR); UNIVERSITE GRENOBLE ALPES, Saint Martin d'Heres (FR)

(72) Inventors: Cédrick Chappaz, Crolles (FR); Fabrice Casset, Tencin (FR); Skandar Basrour, Grenoble (FR); Marie Gorisse, Voiron (FR)

(73) Assignees: COMMISSARIAT A L'ENERGIE ATOMIQUE ET AUX ENERGIES ALTERNATIVES, Paris (FR); STMICROELECTRONICS (CROLLES 2) SAS, Crolles (FR); UNIVERSITE GRENBOLE ALPES, Saint Martin d'Heres (FR); INSTITUT POLYTECHNIQUE DE GRENOBLE, Grenoble (FR)

( * ) Notice: Subject to any disclaimer, the term of this patent is extended or adjusted under 35 U.S.C. 154(b) by 0 days.

(21) Appl. No.: 15/532,969

(22) PCT Filed: Dec. 3, 2015

(86) PCT No.: PCT/EP2015/078478
§ 371 (c)(1),
(2) Date: Jun. 2, 2017

(87) PCT Pub. No.: WO2016/091708
PCT Pub. Date: Jun. 16, 2016

(65) Prior Publication Data
US 2018/0267607 A1 Sep. 20, 2018

(30) Foreign Application Priority Data
Dec. 8, 2014 (FR) .................................. 14 62035

(51) Int. Cl.
*G06F 3/01* (2006.01)
*G10K 11/20* (2006.01)
(Continued)

(52) U.S. Cl.
CPC ............ *G06F 3/016* (2013.01); *G06F 1/1626* (2013.01); *G06F 1/1688* (2013.01); *G10K 11/20* (2013.01); *G10K 11/36* (2013.01); *B06B 1/0648* (2013.01)

(58) Field of Classification Search
CPC ...... G06F 1/1626; G06F 1/1688; G06F 3/016; G06F 3/043; G06F 3/0436; B06B 1/06; (Continued)

(56) References Cited

U.S. PATENT DOCUMENTS 5,591,945 A * 1/1997 Kent ..................... G06F 3/0418
178/18.04
6,313,829 B1 * 11/2001 Tolt .......................... G06F 3/043
178/18.01
(Continued)

FOREIGN PATENT DOCUMENTS

FR 2 437 070 A1 4/1980
JP 2007-65798 A 3/2007
(Continued)

OTHER PUBLICATIONS

P. Sergeant et al., "Geometrical optimization of an ultrasonic tactile plate," Sensors and Actuators A, vol. 161, No. 1-2, Jun. 1, 2010, pp. 91-100.
(Continued)

*Primary Examiner* — Keith L Crawley (74) *Attorney, Agent, or Firm* — Baker & Hostetler LLP (57) ABSTRACT

A vibrating device comprises: a first support configured to be deformed having a surface defined in a plane in directions X and Y; at least one actuator configured to generate plate modes propagated in the first support; the first support comprising: at least one defect with respect to the propagation of the plate modes; the defect being of geometrical nature or corresponding to a structural heterogeneity; comprising: a second support; at least one embedded mechanical reflector secured to the first support and in contact with the first support, configured to immobilize the first support in at least one direction Z at right angles to the directions X and Y, the mechanical reflector being secured to the second support and; the embedded mechanical reflector being configured to isolate a so-called active zone belonging to the surface defined in a plane in directions X and Y in which the plate modes are propagated, the active zone excluding the defect; the actuator being situated in the active region.

20 Claims, 11 Drawing Sheets

(51) Int. Cl.
| | | |
|---|---|---|
| *G10K 11/36* | (2006.01) | |
| *G06F 1/16* | (2006.01) | |
| *B06B 1/06* | (2006.01) | |

(58) Field of Classification Search
CPC ... B06B 1/0622; B06B 1/0648; B06B 1/0681; B06B 3/04; B06B 2201/55; G10K 11/20; G10K 11/36; G10K 2210/129; G10K 2210/3036; H03H 3/02; H03H 3/08; B81B 3/0021; B81B 3/0048; H01L 41/09; H01L 41/098; H01L 41/253
See application file for complete search history.

(56) References Cited

U.S. PATENT DOCUMENTS

| | | | |
|---|---|---|---|
| 2011/0291976 A1* | 12/2011 | Takada | G06F 3/016 345/173 |
| 2012/0038471 A1 | 2/2012 | Kim et al. | |
| 2014/0347322 A1* | 11/2014 | Kamata | G06F 3/041 345/174 |
| 2015/0036864 A1* | 2/2015 | Ozasa | H04R 7/045 381/388 |
| 2015/0054756 A1* | 2/2015 | Ikeda | G06F 3/016 345/173 |
| 2016/0209979 A1* | 7/2016 | Endo | G06F 3/0488 |
| 2018/0018022 A1* | 1/2018 | Hoshi | G06F 3/041 |
| 2018/0052567 A1* | 2/2018 | Miyamoto | G06F 3/01 |

FOREIGN PATENT DOCUMENTS

| | | |
|---|---|---|
| WO | 2013/109090 A1 | 7/2013 |
| WO | 2013/175761 A1 | 11/2013 |

OTHER PUBLICATIONS

M. Biet et al., "Squeeze film effect for the design of an ultrasonic tactile plate," IEEE transactions on ultrasonics, Ferroelectrics and Frequency control, vol. 54, No. 12, Dec. 2007, pp. 2678-2688.
Y. Gomez-Ullate et al., "Lamb waves generation in plates using glued piezoceramics," Bol. Esp. Ceramica y Vidrio, vol. 45, No. 3, 2006, pp. 188-191.
M. R. Mofakhami et al., "Lamb wave interaction with non-symmetric features at structural boundaries," GAMM 2008.
F. Benmeddour et al., "Generation of a selected Lamb mode by piezoceramic transducers: Application to nondestructive testing of Aeronautical structures," Piezoelectric Materials and Devices—Practice and applications, ISBN 978-953-51, published Feb. 27, 2013.
O. Diligent, "Interaction between fundamental Lamb modes and defects in plates," Thesis of the University of London, 2003.
M. Predoi et al., "Ultrasonic guided waves sensitivity to flaws near plate edge," U. P. B. Sci. Bull., Series D, vol. 72, Issue 2, 2010, pp. 17-22.
S. Ceribasi et al., "Free vibration of super elliptical plates with constant and variable thickness by Ritz method," Journal of Sound and Vibration 319, 2009, pp. 668-680.
M. Destrade et al., "A wave near the edge of a circular disk," The Open Acoustic Journal, 2008, pp. 15-18.
M. Hribsek et al., "Surface Acoustic Wave sensors in mechanical engineering," FME Transactions, vol. 38, 2010, pp. 11-18.
S. Tatsuma et al., "Sharp tactile line presentation array using edge stimulation method," 2014 IEEE Haptics Symposium, Feb. 23, 2014, pp. 271-275, XP032582584.
Notification of First Office Action issued in Chinese Patent Application No. 2015800749200 dated Dec. 7, 2018.

* cited by examiner

VIBRATING DEVICE COMPRISING EMBEDDED MECHANICAL REFLECTORS FOR DEFINING AN ACTIVE PLATE MODE PROPAGATION AREA AND MOBILE APPARATUS COMPRISING THE DEVICE

CROSS-REFERENCE TO RELATED APPLICATIONS

This application is a National Stage of International patent application PCT/EP2015/078478, filed on Dec. 3, 2015, which claims priority to foreign French patent application No. FR 1462035, filed on Dec. 8, 2014, the disclosures of which are incorporated by reference in their entirety.

FIELD OF THE INVENTION

The field of the invention is that of the vibrating supports that can be used in many applications and notably that relating to the haptic interface corresponding to a technology in which an object can interact with the environment by the sense of touch and which is particularly advantageous for cell phones.

BACKGROUND

In effect, currently, the manufacturers of cell phones who have ventured into the touchscreen mobile sector are seeking to be distinguished by incorporating a haptic interface. Thus, when a user slides his or her finger over an icon situated on the screen, he or she can feel a slight vibration originating from the mobile, a sensed vibration returning to him or her the impression of pressure on a button.

In this context, the applicants have developed a solution using thin piezoelectric layers as actuator and have demonstrated the possibility of obtaining a haptic field by using a piezoelectric material such as PZT (lead zirconate titanate) which makes it possible to actuate a plate mode such as the antisymmetrical Lamb or Rayleigh wave propagation mode. This vibration mode induces an air blade called "squeeze film" effect between the finger and the plate, which provokes a modification of the friction coefficient between the plate and the finger. A vibration of the wave created in the plate induces a controlled variation of the friction coefficient between the finger and the plate.

Generally, the vibration modes are well controlled in the context of a rectangular plate and are disrupted when the geometry used is unconventional and has, for example, rounded corners. In this case, a solution has to be found to the problem of wave propagation disturbance in this type of geometry.

A large number of references report on the study of these vibration modes on various structures and the propagation of the Lamb waves has been the subject of numerous studies, but generally intended for non-destructive inspection of structures.

There are thus many references relating to the study of the propagation of Lamb waves in rectangular plates, and articles that can notably be cited are those of: P. Sergeant, F. Giraud, B. Lemaire-Semail, "Geometrical optimization of an ultrasonic tactile plate", Sensors and Actuators A 161, pp. 91-100, 2010, and M. Biet, F. Giraud, B. Lemaire-Semail, "Squeeze film effect for the design of an ultrasonic tactile plate", IEEE transactions on ultrasonics, Ferroelectrics and Frequency control, vol. 54, no 12, December 2007, pp. 2678-2688, in relation to haptic systems.

Other articles study the propagation of the Lamb waves in rectangular plates for the purposes of non-destructive inspection of structures: Y. Gomez-Ullate and al, "Lamb waves generation in plates using glued piezoceramics", bulletin from the Spanish company Ceramica y Vidrio, vol 45, 2006, pp. 188-191.

Studies have already been made on non-rectangular plates, or plates having particular features at their ends. In effect, there are articles reporting on the study of beveled plates, notably in aerospace, or the bevel at the end of the plate is induced by the techniques of assembly of the various parts. This type of study can be found in the article by M R. Mofakhami and C. Boller, "Lamb wave interaction with non-symmetric features at structural boundaries", GAMM 2008, N. Wilkie-Chancellier. In these publications, the aim is to study the reflection of the Lamb wave on this type of particular feature in order to conduct a non-destructive inspection. What is not reported or studied is how to overcome the particular feature at the end of the plate to retain the Lamb wave.

Many references report the study of the propagation of Lamb waves in rectangular plates with defects such as discontinuities: F. Benmeddour and E. Moulin, "Generation of a selected Lamb mode by piezoceramic transducers: Application to nondestructive testing of Aeronautical structures", in Piezoelectric materials and devices—Practice and applications, ISBN 978-953-51, published Feb. 27, 2013], circular or rectangular holes, through or blind: O. Diligent, "Interaction between fundamental Lamb modes and defects in plates", Thesis of the University of London, 2003, M V. Predoi, A. Negrea, "Ultrasonic guided waves sensitivity to flaws near plate edge", UPC. Sci. Bull., Series D, Vol 72, Iss. 2, 2010. Here again, the aim is to study systems for non-destructive testing of structures. The Lamb wave is used to reveal the defect and overcoming it is not studied.

There are also references studying the vibrations of the rectangular plates with rounded corners (super elliptical plates): S. Ceribasi, G. Altay, "free vibration of super elliptical plates with constant and variable thickness by Ritz method", Journal of Sound and Vibration 319, 2009, pp. 668-680. However, none of these references proposes any solution making it possible to retain, in these plates with rounded corners, a mode such as that which can be obtained in a rectangular plate, for example by modifying the limit conditions.

The circular plates are also covered in the article by M. Destrade, Y B. Fu, "A wave near the edge of a circular disk", The open acoustic journal, 2008, pp. 15-18 which studies, for example, a surface wave in a disk, a study which does not impinge on the present invention.

To sum up, the above-mentioned references are essentially geared to the non-destructive testing of structures and in which the vibration mode is used to reveal defects. These references do not present any solutions making it possible to overcome the defect present to obtain a wave of desired form.

To address this problem of presence of a defect, the applicants considered it more relevant to move away from the issue (plate, Lamb wave) to turn toward the issue of acoustic resonators, for which the aim is precisely to retain the vibration mode with the best possible quality factor.

In the case of surface acoustic wave resonators, SAWs, a system of interdigital combs is used to generate a surface wave, propagated in the plane of the resonator. To optimize the quality factor of the device and avoid a loss of energy with a dispersion of the wave, reflectors are arranged on either side of the interdigital comb system, as shown in the article by M F. Hribsek, D V. Tosic, M R. Radosavljevic, "Surface Acoustic Wave sensors in mechanical engineering", FME transactions, 38, 2010, pp. 11-18.

SUMMARY OF THE INVENTION

The aim of these reflectors is to create an acoustic impedance difference. The wave being propagated is thus reflected on this medium of different impedance and can be contained in the "active" part of the resonator.

In this context, the present invention proposes a solution making it possible to mitigate the problem of disturbance of the plate modes in a support having a defect whether it is of edge defect type geometrical nature or whether this defect corresponds to a structural heterogeneity (hole, overthickness, change of material, etc.).

Thus, the subject of the present invention is a vibrating device comprising:
  a first support configured to be deformed having a surface defined in a plane in directions X and Y;
  at least one actuator configured to generate plate modes being propagated in said first support;
  said first support comprising:
    at least one defect with respect to the propagation of the plate modes;
    said defect being of geometrical nature or corresponding to a structural heterogeneity;
  characterized in that it comprises:
    a second support;
    at least one embedded mechanical reflector secured to said first support and in contact with said first support, configured to immobilize said first support in at least one direction Z at right angles to said directions X and Y, said mechanical reflector being secured to said second support and;
    said embedded mechanical reflector being configured to isolate a so-called active zone belonging to said surface defined in a plane in directions X and Y in which the plate modes are propagated, said active zone excluding said defect;
    said actuator being situated in said active region.

Plate modes are defined as modes such as Lamb or Rayleigh wave propagation modes.

According to the present invention, an embedded mechanical reflector is defined as a reflecting structure for the plate modes generated and constituting an immobilizing position in the first support intended to be vibrated, said immobilizing position being secured to said second support.

The embedded reflectors of the invention are material elements such as, for example, a plate, a wall, a set of blocks, in contact with the first support. These material elements are not comparable to slits which allow the waves to pass at their ends.

The reflector of the invention can be in contact with the first support by any means and, for example, by direct contact, by bonding, by fitting, etc.

Moreover, a defect with respect to the propagation of the plate modes is defined as a defect generating disturbances at antinodes and nodes of a propagation mode relative to those obtained in the case of the propagation of a same mode generated in a defect-free support, i.e. in the context of the present invention, a homogeneous support of rectangular geometry.

According to a variant of the invention, the first support comprises defects, the device comprising a set of embedded mechanical reflectors configured to define said active zone, excluding said defects.

According to a variant of the invention, the first support comprises defects, the device comprising a set of embedded mechanical reflectors configured to define several active zones, excluding said defects.

According to a variant of the invention, said first support comprises, at the periphery, roundings, said device comprising at least one pair of embedded mechanical reflectors configured to define said active zone, excluding said roundings.

According to a variant of the invention, said device comprises a set of actuators.

According to a variant of the invention, the actuators are distributed linearly in the directions X and/or Y.

According to a variant of the invention, the device comprises at least one or more actuators positioned on the surface of said first support, opposite that facing said second support.

According to a variant of the invention, the device comprises at least one or more actuators positioned on the surface of said first support, facing said second support.

According to a variant of the invention, the embedded mechanical reflector comprises elementary discrete elements separated from one another by a distance such that it makes it possible to isolate said defect from said active zone.

According to a variant of the invention, said first support is a plate.

According to a variant of the invention, the second support is a casing in which the first support is positioned.

According to a variant of the invention, the first support comprises at least one embedment region, the second support comprising at least one protuberance capable of cooperating with said embedment region to immobilize it in the direction Z and render the protuberance secured to the first support, the protuberance and the embedment region defining said embedded mechanical reflector.

According to a variant of the invention, the device comprises at least one glue element, locally gluing the first support to the second support and defining said embedded mechanical reflector.

According to a variant of the invention, the device comprises a haptic face plate with at least one defect.

According to a variant of the invention, the haptic face plate has a rectangular geometry with rounded corners.

According to a variant of the invention, the haptic face plate has a diagonal of between 10 cm and 12 cm and embedded mechanical reflectors having a width of between 2 mm and 10 mm.

According to a variant of the invention, the device comprises two columns of mechanical reflectors, of which one is positioned at the end of the face plate, at the rounding limit.

According to a variant of the invention, the haptic face plate has at least one transparent part.

Another subject of the invention is a mobile unit comprising a device according to the invention, the unit being able to be a "smartphone": an advanced telephone in terms of functionalities, a portable computer, etc.

BRIEF DESCRIPTION OF THE DRAWINGS

The invention will be better understood and other advantages will become apparent on reading the following description given in a nonlimiting manner and from the attached figures in which.

DETAILED DESCRIPTION

Figure 1A:
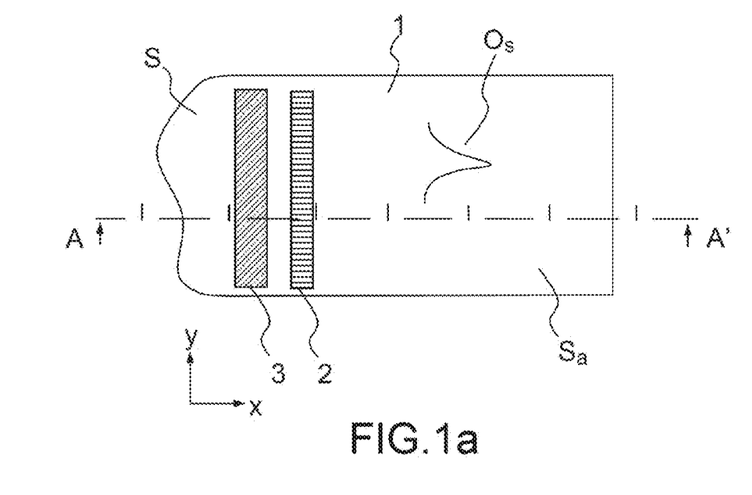
FIGS. 1a and 1b schematically represent a vibrating device of the present invention comprising at least one embedded mechanical reflector.
Figure 1B:
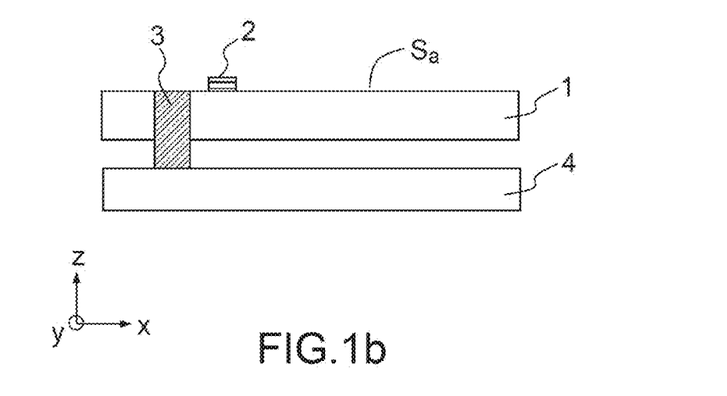

Generally, the present invention relates to a device comprising at least one embedded mechanical reflector making it possible to ensure a suitable plate mode propagation on the surface of a support. FIG. 1a thus schematically represents a first support 1 comprising a surface S defined in a plane X,Y defined by the directions X and Y (or axes X and Y) orthonormal in an orthonormal reference frame (X,Y,Z) with at least one defect in the context of the present invention. In the case represented, this is an outline defect: for example a partially rounded and non-rectangular periphery. The support 1 thus comprises at least one actuator 2 capable of generating plate modes referenced Os, of Lamb wave type, and at least one embedded mechanical reflector 3, making it possible to define a so-called active surface Sa, isolated from the non-rectilinear outline part, where the propagation of the plate modes is produced so as to be able to be correctly used. The first support 1 is secured to a second support 4, making it possible to locally immobilize, on the axis Z, the secured region constituting the embedded mechanical reflector, as schematically represented in FIG. 1b, the shadings schematically represent the embedded mechanical reflector function (it should be noted that the actuator can be either on the face opposite the reflector, or on the same face).

Thus, it is proposed to mitigate the presence of defects with respect to the propagation of plate modes in a device using them by introducing at least one embedded mechanical reflector.

The applicants explain hereinbelow the approach adopted used to design such a device. Generally, the devices using the propagation of Lamb wave propagation mode type plate mode, can comprise a plate typically of rectangular geometry.

Figure 2A:
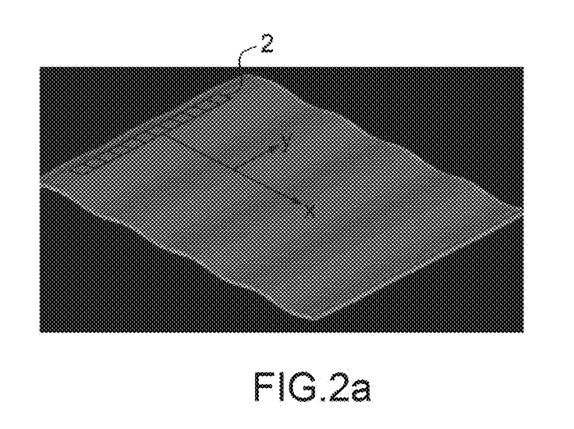
FIGS. 2a and 2b illustrate an antisymmetrical Lamb mode on a rectangular plate.
Figure 2B:
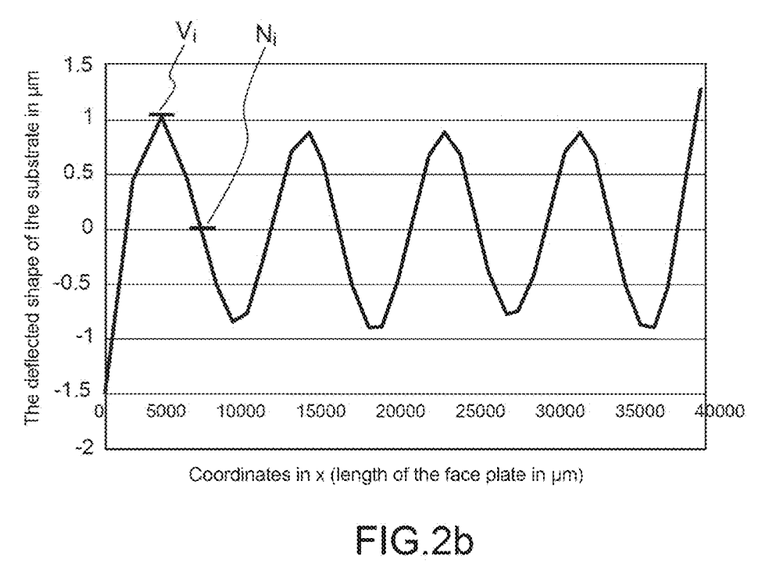

Starting from this type of geometry, the applicants studied an antisymmetrical Lamb mode $A_0$, obtained by using piezoelectric actuators shrewdly placed on a plate having a surface area of 40×30 mm$^2$ (with a thickness of 725 µm), as shown in FIG. 2a (3D view obtained from a finite elements simulation, method known by the acronym "FEM", standing for "Finite Element Method", under the Coventor commercial software and seen in cross section), highlighting the number of antinodes corresponding to energy maxima and nodes corresponding to a null displacement upon the vibration. In FIG. 2b, which illustrates more specifically the vibration mode sought, for example an antisymmetrical Lamb mode, here on the rectangular plate, the mode exhibits, for example, 8 antinodes Vi separated by nodes Ni.

The applicants search for how to conserve the desired vibration mode, for example the antisymmetrical Lamb standing mode $A_0$ presented in FIGS. 2a and 2b, in a non-rectangular plate.

The example studied is a rectangular plate with rounded corners, but the invention can be extended to other types of non-rectangular plate geometries, possibly exhibiting any geometry in the plane (X,Y).

In a plate with rounded edges, the same vibration mode could not be generated with thin layer actuators, even by working on the positioning of the actuators, because of the interferences provoked by the roundings.

Figure 3:
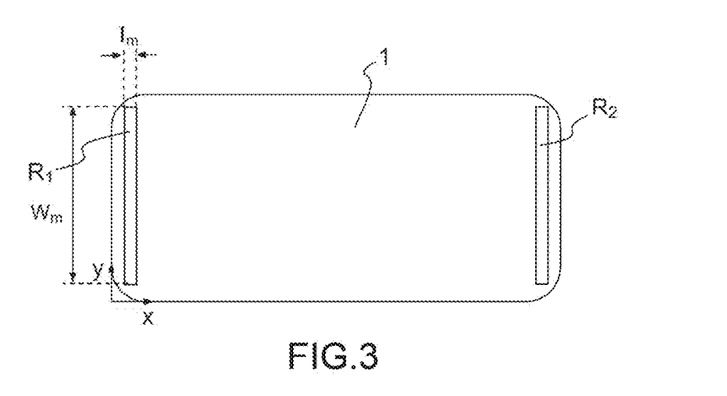
FIG. 3 schematically represents an example of a first support comprising a plate with rounded ends and comprising a pair of acoustic reflectors.

This is why the applicants turn to the use of acoustic reflectors making it possible to draw a parallel with those developed for SAWs. FIG. 3 schematically represents a plan view of an example of a plate 1 with rounded ends and comprising a pair of reflectors $R_1$ and $R_2$.

When these reflectors are shrewdly placed as explained later in the present description, it is possible, by FEM simulations, to determine the dimension ($w_m$) corresponding to the dimension in the direction Y, the dimension ($l_m$) corresponding to the dimension in the direction X and the thickness of the reflector ($t_m$) corresponding to the dimension in the direction Z, as well as the appropriate properties (density) of the material used. The properties making it possible to obtain the desired Lamb mode, on the plate with rounded corners, are given in the table below which represents the dimensioning of the reflectors that make it possible to obtain the Lamb mode on the plate with rounded corners considered, for example a plate of Dragontrail glass from the company Asahi Glass (800 µm thick).

Two types of plates were simulated, corresponding to different radii of curvature of the roundings (concrete cases of existing cell phone face plates were simulated).

It can be noted that the thicknesses $t_m$ and/or the densities needed are very significant and difficult to access physically, requiring a solution other than that using known acoustic wave reflectors to be sought.

| Parameter (mm) | iPhone 5 (dimensions = 4 inches) | | Lumia 920 (dimensions = 4.5 inches) | |
|---|---|---|---|---|
| | 25 kHz (13) | 33 kHz (15) | 27 kHz (14) | 35 kHz (16) |
| Position on x | 2 | 5 | 4.5 | 3.5 |
| $l_m$ | 4 | 2-3 | 2 | 2.5 |
| $w_m$ | 45 | 35-45 | 66 | 55-60 |
| $t_m$ | 2-100 | 30-400 | 2-100 | 2 |
| $\rho_m$ | <10 000 | 200 000 | max | <1 000 |

That is why, starting from this observation, the applicants turned to another solution and propose a vibrating device using at least one mechanical reflector, instead of a "conventional" acoustic reflector, making it possible, in addition to the acoustic reflection of the wave which ensures the desired mode in a non-rectangular plate, to maintain the propagation properties as in a plate of rectangular configuration.

The present invention thus proposes a solution in which mechanical embedments are used as reflectors with respect to mechanical waves.

Figure 4:
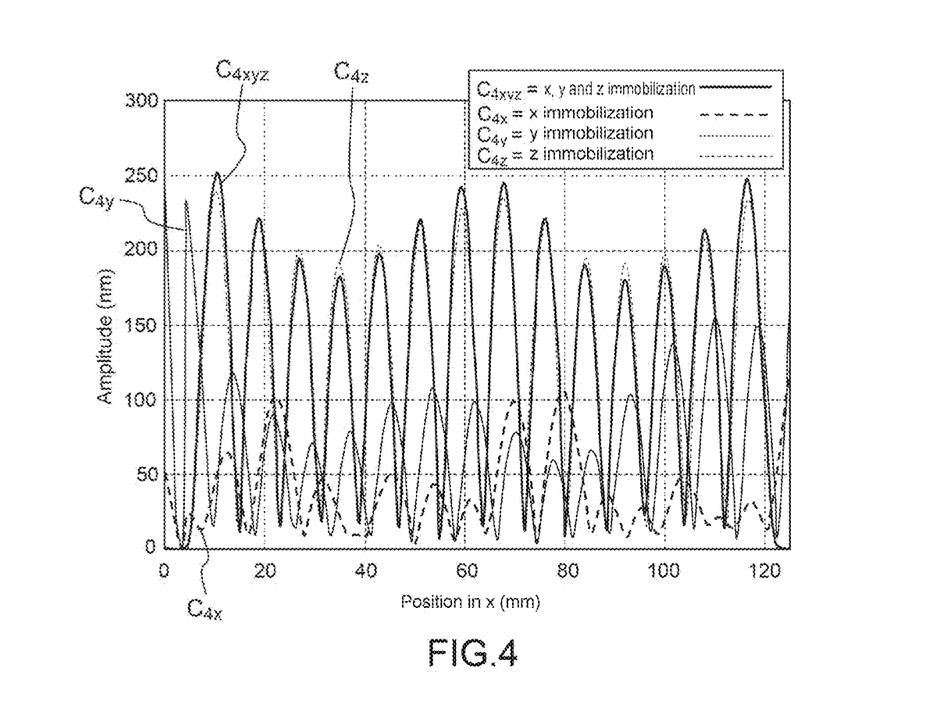
FIG. 4 illustrates the absolute value of the amplitude of the antinodes of a Lamb mode with 14 antinodes of a Lumia 920 screen made of Dragontrail glass as a function of the position on for four different types of embedments.

FIG. 4, taken from FEM simulation with the commercial simulation tool ANSYS, provides the absolute value of the amplitude of the antinodes of a mode with 14 antinodes of a Lumia 920 screen made of Dragontrail glass also called face plate (800 μm thick) as a function of the position on X for four different types of embedments, the curve $C_{4X}$ relates to an immobilization in the direction X, the curve $C_{4Y}$ relates to an immobilization in the direction Y, the curve $C_{4Z}$ relates to an immobilization in the direction Z and the curve $C_{4XYZ}$ relates to an immobilization in all three directions X, Y and Z. This figure shows that, in the case of a rectangular plate with rounded corners (dimensions of a Lumia 920 screen, 4.5 inch diagonal (or 11.43 cm), Dragontrail glass thickness 800 μm), embedded mechanical reflectors making it possible to restore the desired Lamb mode. Also, it emerges from all of these curves that the necessary embedment is only like an immobilization of the face plate in the direction Z, that is to say an immobilization preventing the face plate from being displaced in this off-plane direction.

To also dimension embedded mechanical reflectors of other types of non-rectangular plates, the applicants studied non-rectangular plates having dimensions deriving from existing smartphones, this methodology being able to be used also to dimension embedded mechanical reflectors of other types of non-rectangular plates.

Figure 5:
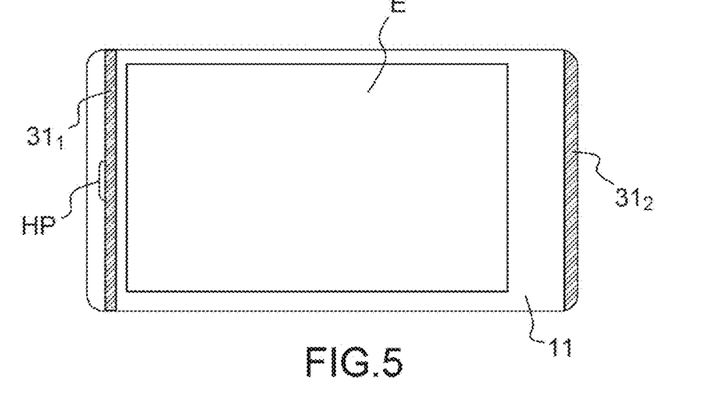
FIG. 5 schematically represents a Lumia 920 face plate that can be used in an example of a first support of a device of the invention and comprising roundings and a material defect corresponding to a hole for placing a loudspeaker.

In detail, the applicants thus studied a plate with rounded corners corresponding to the dimensions of a face plate of a Lumia 920 (4.5 inches for this existing smartphone) (by implementing the invention in this face plate) and represented in FIG. 5, i.e. a first support 11 comprising a transparent screen E, at the periphery of which are arranged two embedded mechanical reflectors $31_1$ and $31_2$ and a loudspeaker HP.

This plate thus comprises outline defects (rounded corners) and material defects (hole left at the loudspeaker position), the mechanical reflectors being positioned to exploit the maximum of space of the plate, that is to say by defining an active surface that is as large as possible by locking the roundings of the outline.

For that, the following methodology is applied:

the modelling of the geometry of the vibrating plate is produced, on which two beads of embedded mechanical reflectors are positioned;

a modal analysis is initiated under the commercial FEM software (ANSYS) to identify the frequency of the mode sought;

according to the FEM model, the piezoelectric actuators are positioned on vibration antinodes, dependent on the frequency of the mode retained (the methodology for optimizing the positioning of the actuators is known to those skilled in the art);

a harmonic simulation is then carried out, or a series of harmonic simulations, in order to best position the embedded mechanical reflectors, the position of the actuators evolving therefrom. In effect, after having determined the position of the embedded mechanical reflector or reflectors making it possible to delimit the active surface, the actuator or actuators then have to be positioned on this active surface.

Figure 6:
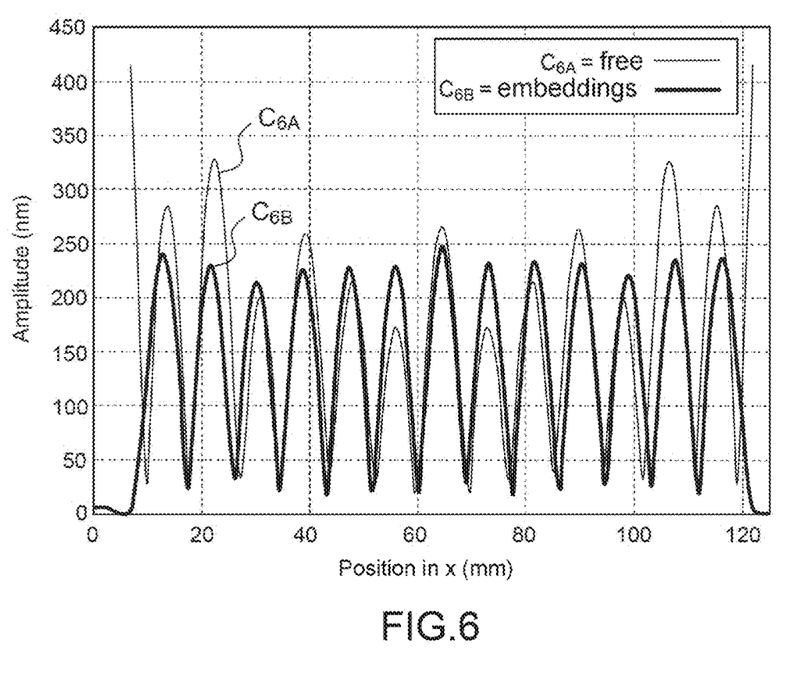
FIG. 6 illustrates the amplitude of a Lamb mode as a function of the position on X, obtained on a plate with rounded corners of Lumia 920 type with embedded mechanical reflector or without: called free, for a mode with 13 antinodes.

FIG. 6 illustrates the amplitude of a Lamb mode as a function of the position on X, obtained on a plate with rounded corners of Lumia 920 type without an embedded mechanical reflector: so-called free configuration (curve $C_{6A}$) or with embedded mechanical reflector (curve $C_{6B}$), for a mode with 13 antinodes.

Figure 7:
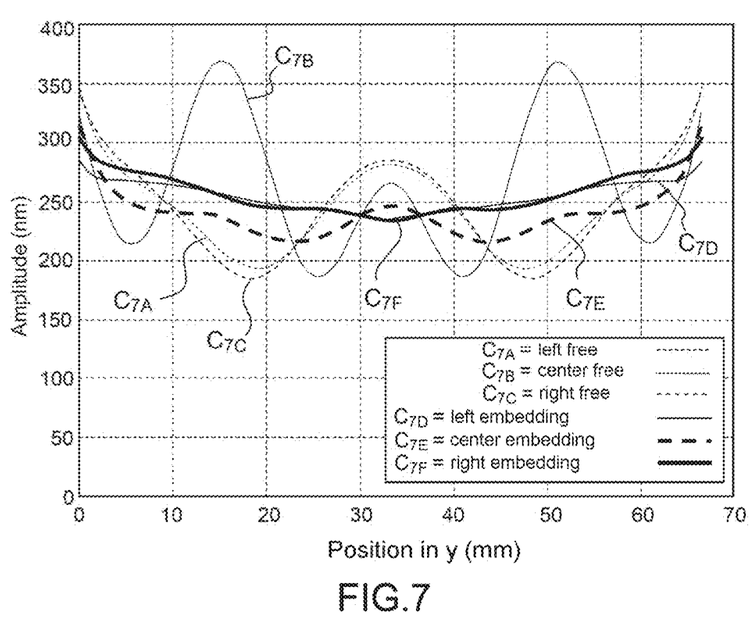
FIG. 7 illustrates the amplitude of a Lamb mode as a function of the position on Y, obtained on a plate with rounded corners of Lumia 920 type, and for three observations at three points of the plate.

FIG. 7 illustrates the amplitude of a Lamb mode as a function of the position on y in the direction Y, obtained on a plate with rounded corners of Lumia 920 type, and for three observations at three points of the plate: at the left end, at the right end and at the center (in the direction X). The curve $C_{7A}$ relates to a free configuration taken at the left end, the curve $C_{7B}$ relates to a free configuration taken at the center, the curve $C_{7C}$ relates to a free configuration taken at the right end. The curve $C_{7D}$ relates to a configuration with embedded mechanical reflector taken at the left end, the curve $C_{7E}$ relates to a configuration with embedded mechanical reflector taken at the center, the curve $C_{7F}$ relates to a configuration with embedded mechanical reflector taken at the right end.

These figures show that, with embedded mechanical reflectors, it becomes possible to restore, on a rectangular plate with rounded corners, a Lamb mode such as that obtained on a rectangular plate, namely: a subset of vibration antinodes and nodes in the direction X and little modulation in the direction Y.

The applicants have thus proven that embedded mechanical reflectors make it possible to overcome disturbances caused by the presence of defects such as rounded corners but also defects of material heterogeneity (in the present case, a hole left at the point of the loudspeaker), and thus conserve a desired vibration mode in a non-rectangular plate, by having delimited a defect-free active surface where the actuators are positioned.

Figure 8:
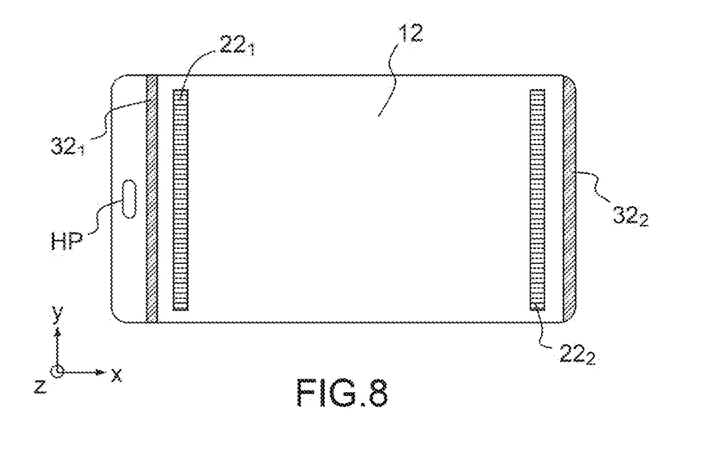
FIG. 8 schematically represents a cell phone screen with two rows of actuators and two rows of embedded mechanical reflectors.

In order to define design rules, the applicants studied the impact of the width ($l_m$) for example that of the embedded mechanical reflector on the right in FIG. 5, on the uniformity of the modes on an 800 μm substrate of Dragontrail glass and for a geometry corresponding to the IPhone 5 (4-inch dimensions). The width of the reflectors corresponds to the dimension of the reflectors in the direction X. The configuration studied is that illustrated in FIG. 8 having on a first support 12, a pair of embedded mechanical reflectors $32_1$ and $32_2$ and two columns of actuators $22_1$ and $22_2$. A loudspeaker HP hole is positioned juxtaposed at the level of an embedded mechanical reflector, the mechanical reflector on the right is positioned at the end of the face plate, but widthwise, it more or less blocks the outline roundings (each reflector prevents the wave from "seeing" the defect which is located behind so, in a way, a reflector is therefore needed for each defect).

Figure 9A:
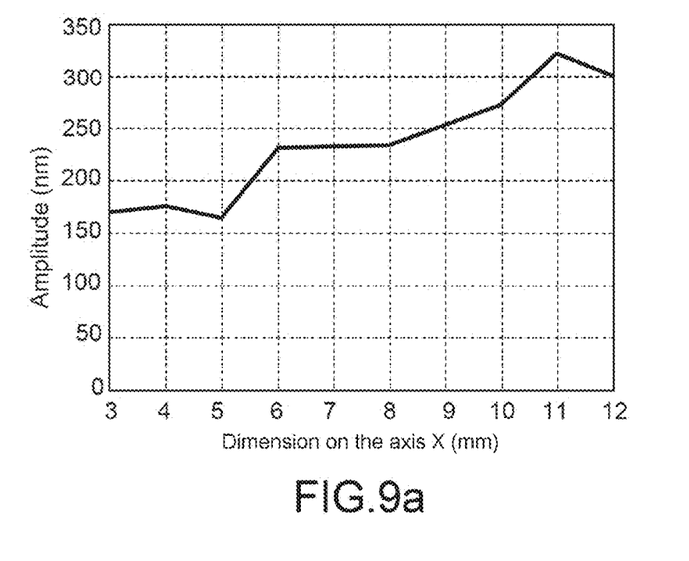
FIGS. 9a and 9b respectively illustrate the amplitude and the deviation in the direction Y, obtained as a function of the dimension in the direction X of the embedment for a mode with 11 antinodes obtained in the case of the screen illustrated in FIG. 8.
Figure 9B:
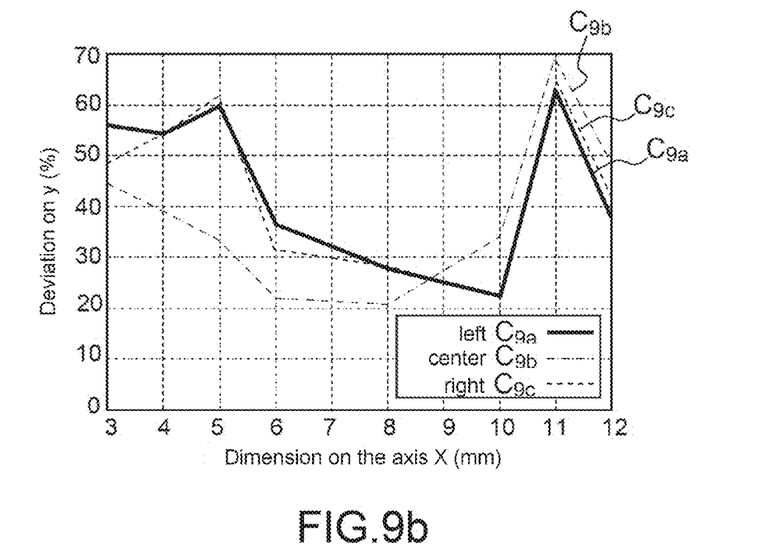

For that, it is possible to vary the dimension in the direction X, of said embedded mechanical reflector on the right $32_2$, and observe the modes obtained. In each case, the optimal position of the actuators must be found. FIGS. 9a and 9b respectively illustrate the amplitude and the deviation in the direction Y, obtained as a function of the dimension in the direction X, of the embedment for a mode with 11 antinodes (curve $C_{9a}$: configuration taken at the left end, curve$_{9b}$: configuration taken at the center and curve $C_{9c}$: configuration taken at the right end).

It appears that embedments of larger dimension in the direction X allow for a better uniformity of the mode on the plate, thus for a greater amplitude at the center of the face plate. However it does not seem useful to exceed a dimension in the direction X of approximately 10-11 mm (in this precise case) because, generally, the optimal dimension in the direction X of the reflectors depends on the wavelength. In effect, the roundings have less impact in these ranges.

The applicants also analyzed the influence of the dimension in the direction X of the embedment and the influence of its position on the face plate.

The same system as that previously described was modelled, with the embedded mechanical reflector on the right placed at the limit of the roundings, and by varying its dimension in the direction X. In this way, the roundings must no longer intervene in the vibration, this approach makes it possible to determine whether the dimension in the direction X of the embedded mechanical reflector intervenes in the amplitude, the frequency or the uniformity. The results are presented in FIGS. 10a and 10b, which also illustrate the amplitude and the deviation in the direction Y as a function of the dimension in the direction X of the embedment for a mode with 11 antinodes. (curve $C_{10a}$: configuration taken at the left end, curve$_{10b}$: configuration taken at the center and curve $C_{10c}$: configuration taken at the right end).

Figure 10A:
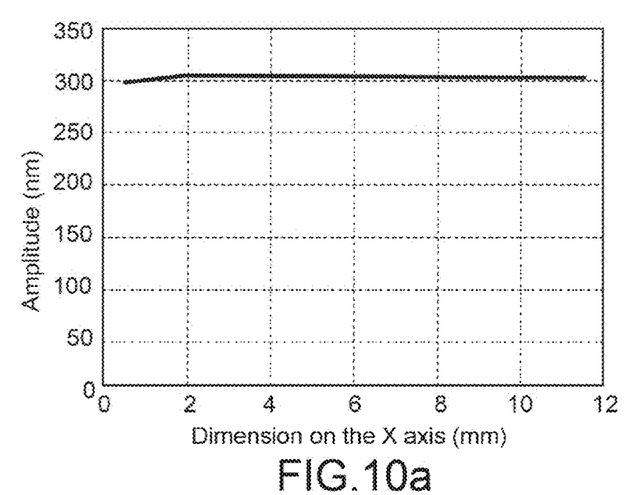
FIGS. 10a and 10b illustrate the amplitude and the deviation on Y as a function of the width of the embedment for a mode with 11 antinodes obtained in the case of the screen illustrated in FIG. 8, with an embedded mechanical reflector placed at the rounding limit of the first support.
Figure 10B:
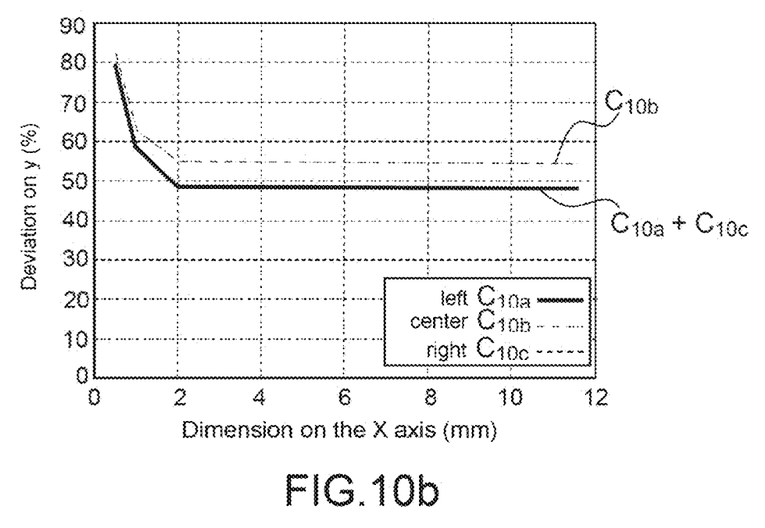

It appears that the amplitude and the uniformity are not modified by the dimension in the direction X of the embedded mechanical reflector as long as this width remains sufficient (approximately 2 mm). For a dimension on the axis X of the embedded mechanical reflector below this value, a significant deformation of the portion of face plate situated after the embedment appears linked to a loss of energy. This is reflected in a loss of uniformity of the order of 40%.

It thus appears that an embedded mechanical reflector having a dimension in the direction X at least equal to 2 mm makes it possible to optimize the amplitude and the uniformity of the mode on the face plate.

The applicants thus sought to determine the optimal positon, in the two directions X and Y, of the embedded mechanical reflector. On the right, it was shown that it is possible to position the embedded mechanical reflector at the end of the face plate, to retain a maximum of available space. The applicants thus sought to determine whether the embedded mechanical reflector has to cover all the dimension on the axis Y of the face plate, and whether it can be positioned at the level of the loudspeaker hole. For that, studies of implementation of the invention on a Lumia 920 screen with a thickness of 800 μm were carried out.

Figure 11:
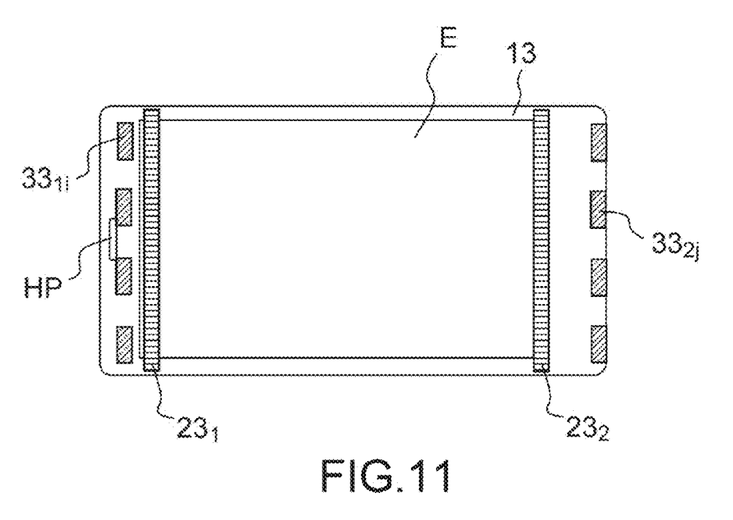
FIG. 11 schematically represents a Lumia 920 screen with a visible zone, the actuators and two series of discretized embedded mechanical reflectors.
Figure 12A:
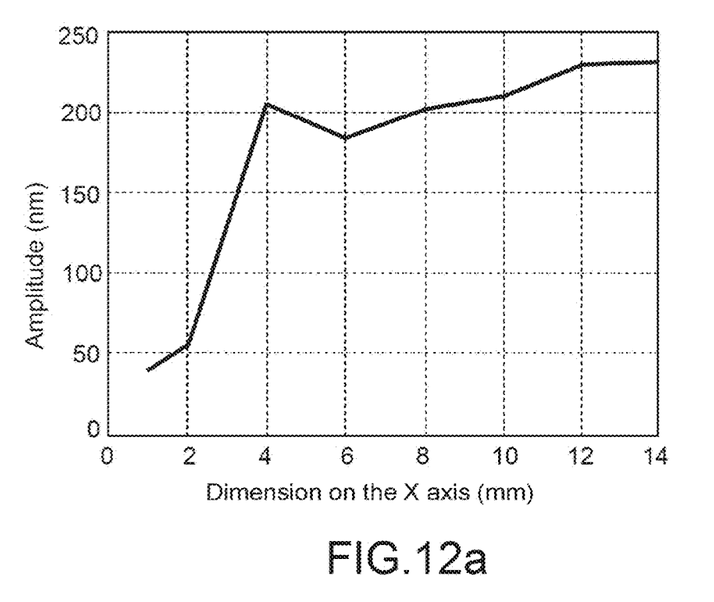
FIGS. 12a and 12b illustrate the amplitude and the deviation on Y as a function of the number of attachment points, with constant dimension in the direction X of embedment.
Figure 12B:
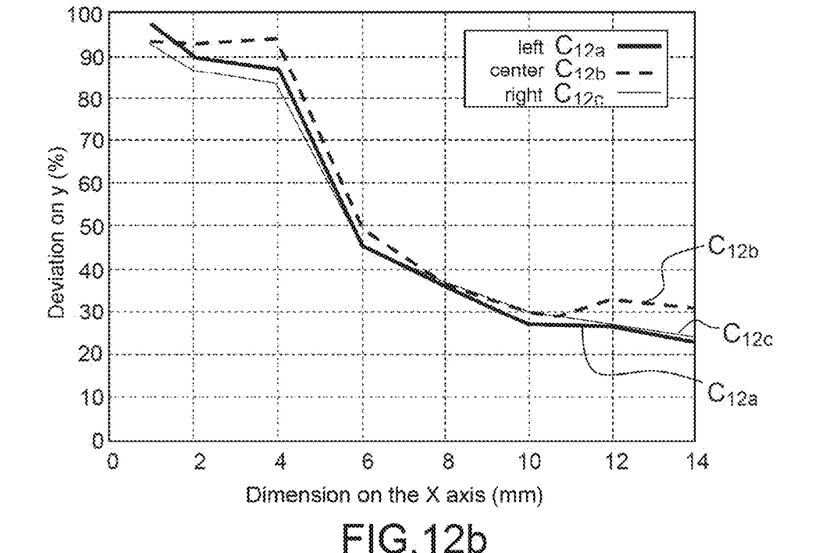

Initially, the position on the axis Y of the embedded mechanical reflectors was studied. For simplicity, two columns of identical embedded mechanical reflectors were taken into consideration respectively made up of reflectors $33_{1i}$ and $33_{2j}$. The first column is positioned just after the hole of the loudspeaker HP. The second column is positioned at the end of the face plate. This is shown in FIG. 11 which illustrates a first support configuration that can be used in a device of the invention and comprising a visible zone E and two series of actuators $23_1$ and $23_2$. The number of embedded mechanical reflectors is modified, these embedded mechanical reflectors covering half of the width of the face plate. It appears that the amplitude increases with the number of embedded mechanical reflectors. It is not essential to have a single embedded mechanical reflector over all the dimension on the axis Y of the face plate. It is nevertheless suitable to have embedded mechanical reflectors sufficiently close to one another to retain the effect counted on. FIGS. 12a and 12b illustrate the amplitude and the deviation on y in the direction Y as a function of the number of embedded mechanical reflectors, with dimension in the direction X of embedment constant (curve $C_{12a}$: configuration taken at the left end, curve $C_{12b}$: configuration taken at the center and curve $C_{12c}$: configuration taken at the right end).

With a sufficient number of embedded mechanical reflectors, the performance levels obtained are satisfactory. In effect, for a given dimension on the axis Y, the increase in the number of reflectors makes it possible to reduce the free space between reflectors.

Figure 13:
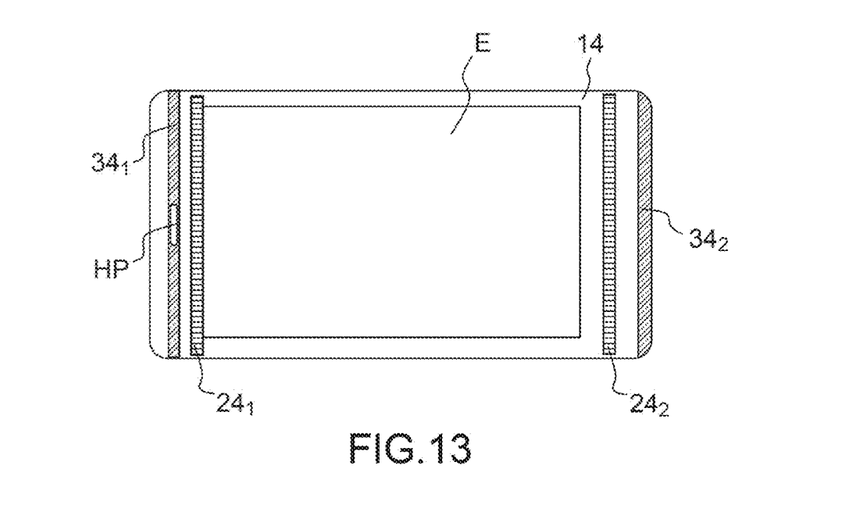
FIG. 13 schematically represents a Lumia 920 screen with embedment on the hole of the loudspeaker.

According to a variant of the invention illustrated in FIG. 13, it is also possible to position the loudspeaker HP at the level of one of the embedded mechanical reflectors $34_1$.

To sum up, an example of an efficient vibrating device according to the present invention, intended to be able to be incorporated in smartphones, can comprise, on a 4 to 4.5 inch face plate, equipped with a loudspeaker hole:

two columns of embedded mechanical reflectors making it possible to immobilize the plate in the direction Z;

one of the columns can be positioned at the end of the face plate;

the dimension on the axis X of the embedded mechanical reflectors lying between approximately 2 mm and less than approximately 10 mm;

the two columns of embedded mechanical reflectors being discretized, with embedded mechanical reflectors separated by a distance less than 5.5 mm.

Figure 14:
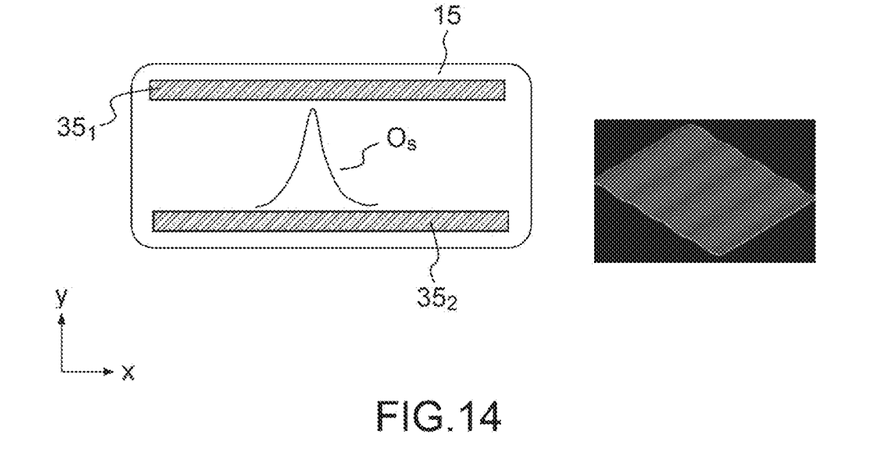
FIG. 14 illustrates a device comprising rows of embedded mechanical reflectors with a wave considered having a propagation in the direction Y.

Configurations were described previously in which the embedded reflectors are positioned parallel to the small sides of a rectangular face plate with rounded corners. This principle can be extended for a positioning of the reflectors parallel to the long sides of such a plate as shown in FIG. 14 which illustrates a device comprising a plate 15, columns of actuators not represented being able to be arranged parallel or orthogonal to the reflectors $35_1$ and $35_2$, the wave considered Os having a propagation in the direction Y. In effect, according to the excitation frequency, even actuators positioned in the direction Y, i.e. orthogonally to the position of the embedded mechanical reflectors, can generate a wave whose wave front is at right angles to said embedded mechanical reflectors.

Figure 15:
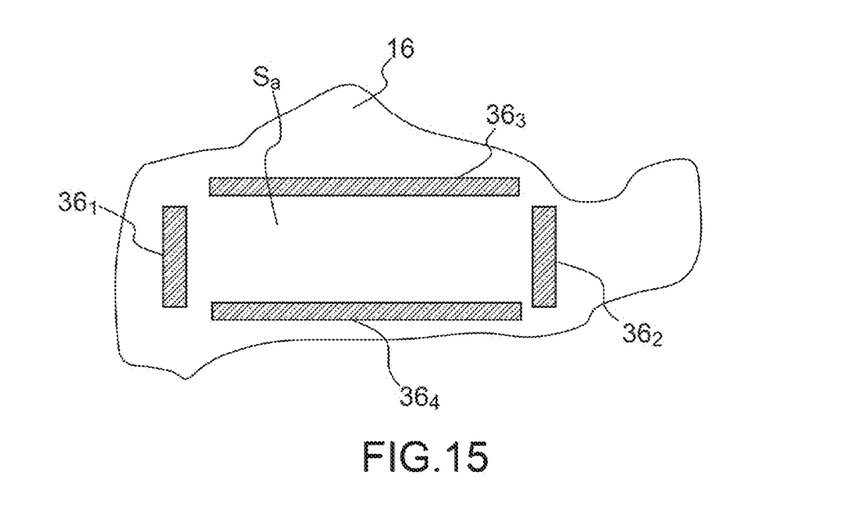
FIG. 15 illustrates any plate geometry that can be used in the present invention and comprising two orthogonal series of embedded mechanical reflectors.

Generally, the present invention can relate to any plate geometry, such as that illustrated in FIG. 15. To delimit the active surface Sa, two series of reflectors are respectively arranged on the axis X: reflectors $36_1$ and $36_2$ and on the axis Y: reflectors $36_3$ and $36_4$. To optimize the positioning of the reflectors, the study methodology described previously can be used according to the wave considered, the position of the actuators, etc.

Example of Application to Haptic Face Plates

A haptic face plate operates by an air blade effect, created on the surface of the face plate by the vibration thereof. This vibration is provoked by piezoelectric actuators glued or deposited and etched on the plate. For a good haptic effect, it is necessary to obtain a vibration amplitude of approximately 1 μm in the Lamb mode $A_0$. The applicants have proven the possibility of obtaining a haptic feel by using thin layer actuators in PZT, a material that is particularly advantageous and sought after in applications for smartphones which have rounded corners as schematically presented previously throughout the description.

First Exemplary Embodiment

The embodiments can depend on the application targeted. In many cases, like that of haptics, producing an embedded mechanical reflector ensuring at least an immobilization in the direction Z is "easy" to implement through fixing a plate ensuring the first support in synergy with a casing secured to said first support.

The embedded mechanical reflector must prevent the movement of the plate in the direction Z. It can for example be ensured by gluing the casing with the resonant plate. The glued region at the level of said plate constituting the embedded mechanical reflector.

The bead of glue has dimensions on x, y (in the plane) dimensioned like those described previously so as to produce an embedded mechanical reflector with the desired dimensions.

Figure 16:
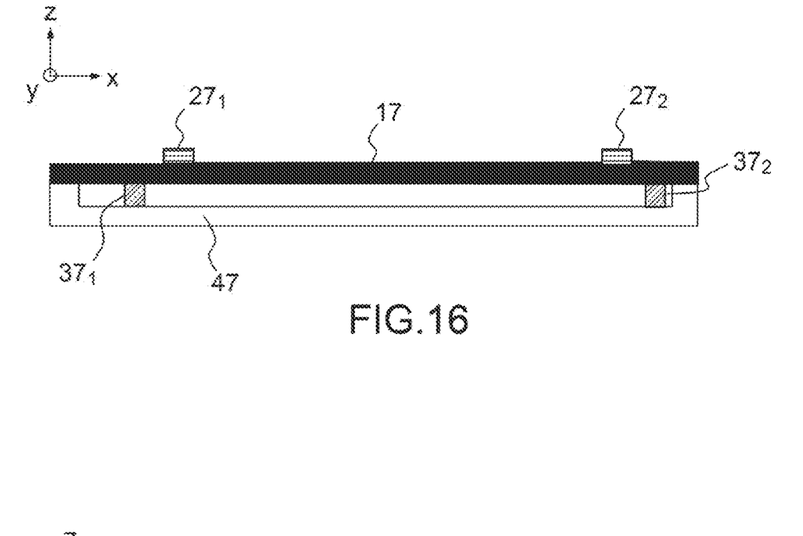
FIG. 16 illustrates a first embodiment of the invention comprising embedded reflectors produced by gluing.

The thickness of glue can also be set according to the material used. The glue can be an epoxy glue, a UV glue or any other suitable glue. This configuration is illustrated in FIG. 16 and highlights:
- a first support 17;
- two actuators $27_1$ and $27_2$ (it should be noted that the actuators can preferentially be on the same side as the reflectors, and they can also be on both sides of the first support);
- two embedded mechanical reflectors $37_1$ and $37_2$ produced by beads of glue;
- a second support 47.

Second Exemplary Embodiment

According to this second example, the embedded mechanical reflector consists of a snap-fitting of the face plate onto the casing. In this case, the vibrating face plate is machined by laser, ion machining or any other suitable method so as to partially etch the face plate in the embedment zones provided by the dimensioning step and thus define the cavities.

Figure 17:
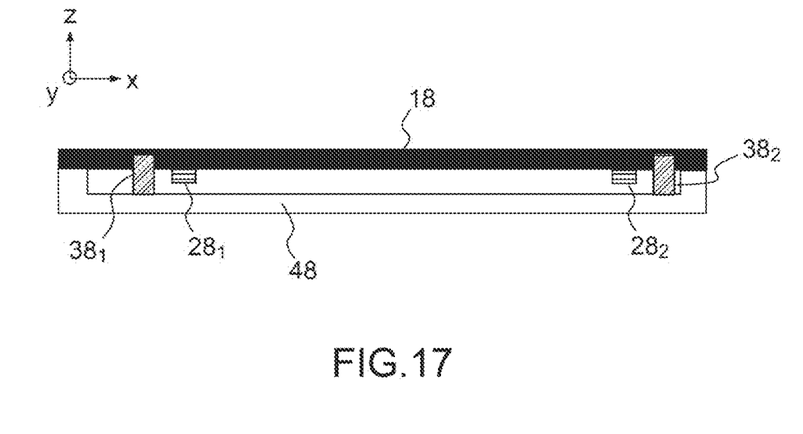
FIG. 17 illustrates a second mode of integration of a plate with embedded reflectors produced by snap-fitting.

This etching can have a depth ranging from a few micrometers to several hundreds of micrometers. Opposite, the casing has pins, produced at the same time in the same material as that of the casing, or produced subsequently and possibly in a material other than that of the casing. The dimensions on the axes X and Y of the pins are set by the dimensions of the opposite cavities (and by design rules for the insertion of the pins to induce the fixing thereof at the face plate level). The height of the pins is matched to the depth of the cover. Upon assembly of the casing and of the vibrating face plate, the pins are inserted and immobilized in the cavities of the face plate so as to immobilize the movement of the plate in the direction Z. This configuration is illustrated in FIG. 17 which highlights:
- a first support 18;
- two actuators $28_1$ and $28_2$, in this example the actuators can equally be situated on the opposite face of the second support (and/or on the other face);
- two embedded mechanical reflectors $38_1$ and $38_2$ produced by pins capable of cooperating with etchings produced at the level of the plate 18;
- a second support 48 corresponding to the casing in which the face plate is positioned.

It should be noted that the configuration of the actuators is given purely as an example in the form of two columns, but many other configurations can be envisaged: a single column of actuators, actuators not arranged in columns but positioned along the long side of the face plate, etc.

The invention claimed is:

1. A vibrating device comprising:
 a first support configured to be deformed having a surface defined in a plane in directions X and Y, said first support comprising at least one defect with respect to the propagation of the plate modes, said defect being of geometrical nature or corresponding to a structural heterogeneity;
 at least one actuator configured to generate plate modes being propagated in said first support;
 a second support;
 at least one embedded mechanical reflector in contact with said first support, the at least one embedded mechanical reflector is secured to said first support such that the first support is immobilized in at least one direction Z at right angles to said directions X and Y, said mechanical reflector being secured to said second support, wherein
 said embedded mechanical reflector being configured to isolate an active zone belonging to said surface defined in a plane in directions X and Y in which the plate modes are propagated, said active zone excluding said defect,
 said actuator being situated in said active zone,
 said embedded mechanical reflector is in contact on at least a first surface with the first support and on at least a second surface with the second support, the first and second surfaces of the embedded mechanical reflector are elongated, and
 the first support including a bottom surface defined in a plane in directions X and Y and the second support including a top surface defined in a plane in directions X and Y that faces the bottom surface of the first support, the embedded mechanical reflector being secured to each of the bottom surface of the first support and the top surface of the second support.

2. The vibrating device as claimed in claim 1, wherein the first support comprises defects, the device comprising a set of embedded mechanical reflectors configured to define said active zone, excluding said defects.

3. The vibrating device as claimed in claim 1, wherein the first support comprises defects, the device comprising a set of embedded mechanical reflectors configured to define several active zones, excluding said defects.

4. The vibrating device as claimed in one of claim 1, wherein said first support comprises, at the periphery, roundings, said device comprising at least one pair of embedded mechanical reflectors configured to define said active zone, excluding said roundings.

5. The vibrating device as claimed in one of claim 1, comprising a set of actuators.

6. The vibrating device as claimed in claim 5, wherein the actuators are distributed linearly in the directions X and/or Y.

7. The vibrating device as claimed in claim 1, comprising at least one or more actuators positioned on the surface of said first support, opposite that facing said second support.

8. The vibrating device as claimed in claim 1, comprising at least one or more actuators positioned on the surface of said first support, facing said second support.

9. The vibrating device as claimed in claim 1, wherein the embedded mechanical reflector comprises elementary discrete elements separated from one another by a distance such that it makes it possible to isolate said defect from said active zone.

10. The vibrating device as claimed in claim 1, wherein said first support is a plate.

11. The vibrating device as claimed in claim 1, wherein the second support is a casing in which the first support is positioned.

12. The vibrating device as claimed in claim 1, wherein:
the first support comprises at least one embedment region;
the second support comprises at least one protuberance capable of cooperating with said embedment region to immobilize it in the direction Z and render the protuberance secured to the first support, the protuberance and the embedment region defining said embedded mechanical reflector.

13. The vibrating device as claimed in claim 1, comprising at least one glue element, locally gluing the first support to the second support and defining said embedded mechanical reflector.

14. The vibrating device as claimed in claim 1, comprising a haptic face plate with at least one defect.

15. The vibrating device as claimed in claim 14, wherein the haptic face plate has a rectangular geometry with rounded corners.

16. The vibrating device as claimed in claim 14, wherein the haptic face plate has a diagonal of between 10 cm and 12 cm and embedded mechanical reflectors having a width of between 2 mm and 10 mm.

17. The vibrating device as claimed in claim 15, comprising two columns of mechanical reflectors, of which one is positioned at an end of the face plate, at a rounding limit.

18. The vibrating device as claimed in claim 14, wherein the haptic face plate has at least one transparent part.

19. A mobile unit comprising a device as claimed in claim 1.

20. The mobile unit as claimed in claim 19, wherein it is a cell phone.

* * * * *

UNITED STATES PATENT AND TRADEMARK OFFICE
CERTIFICATE OF CORRECTION

PATENT NO. : 10,503,259 B2
APPLICATION NO. : 15/532969
DATED : December 10, 2019
INVENTOR(S) : Cédrick Chappaz et al.

Page 1 of 1

It is certified that error appears in the above-identified patent and that said Letters Patent is hereby corrected as shown below:

In the Claims

In Claim 4, Column 12, Line 58, "in one of claim 1," should be -- in claim 1 --.

Signed and Sealed this
Seventeenth Day of March, 2020

Andrei Iancu
*Director of the United States Patent and Trademark Office*